United States Patent Office 2,952,710
Patented Sept. 13, 1960

2,952,710

NOVEL DERIVATIVES OF HEXACHLOROCYCLO-PENTADIENE

Ellis Kirby Fields, Chicago, Ill., assignor to Standard Oil Company, Chicago, Ill., a corporation of Indiana No Drawing. Filed July 28, 1953, Ser. No. 370,891

5 Claims. (Cl. 260—648)

This invention relates to novel reaction products of hexachlorocyclopentadiene with cyclohexene or its alkyl derivatives. And it is particularly concerned with the excellent insecticidal properties of such novel reaction products.

It has been found that such novel derivatives of hexachlorocyclopentadiene, e.g. the product of cyclohexene or an alkyl derivative thereof and hexachlorocyclopentadiene, either as such or additionally chlorinated have outstanding insecticidal properties. These products may be used alone or as ingredients of insecticidal compositions.

Compounds of the type which may be reacted with hexachlorocyclopentadiene in accordance herewith may be represented by the general structure

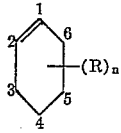

wherein R represents an alkyl radical which may be attached to one or more of the carbons. Thus, $n$ may be 0 or an integer from 1 to 8 inclusive. R may contain from 1 to about 20 carbon atoms and preferably from 1 to about 8. Two hydrocarbon radicals, i.e. two R radicals, may be attached to any of the ring carbons other than those connected by the double bond (i.e. in the 1 and 2 positions). It is preferred that such carbons (i.e. those joined by the double bond) be free of alkyl radicals.

A few examples of compounds suitable for use in accordance herewith are cyclohexene, the various methyl cyclohexenes, e.g. 4-methylcyclohexene, 3-methylcyclohexene, etc., 3,3-dimethylcyclohexene, 3,5-dimethylcyclohexene, 3,6-dimethylcyclohexene, 3-ethylcyclohexene, 1,3,5-trimethyl-5-isopropylcyclohexene, 3-methyl-4-octylcyclohexene, 4-nonylcyclohexene, 5-dodecylcyclohexene, etc.

It should be understood that enumeration of the foregoing specific examples is for purposes of illustration and not of limitation and that any cyclohexene derivative falling within the broad definition may be used in accordance herewith.

Hexachlorocyclopentadiene may be readily prepared by reacting an aliphatic hydrocarbon containing at least 5 carbon atoms or an alicyclic hydrocarbon containing 5 carbon atoms in the ring, or the chlorinated derivatives of these compounds, with chlorine at temperatures between about 350° and 550° C. The 5 carbon atom alicyclic hydrocarbons having the five carbon atoms in the ring, and 5 carbon atom aliphatic hydrocarbons wherein the number of carbon atoms in the longest straight chain is 4 or 5 are particularly suitable for the preparation of hexachlorocyclopentadiene in this manner. A detailed description of this method of preparing hexachlorocyclopentadiene is set forth in U.S. 2,509,160 and it is, therefore, considered unnecessary herein to further describe its method of preparation. It should be understood, however, that this invention is in no way directed or limited to any particular method of preparing that compound.

The molar ratio of hexachlorocyclopentadiene to cycloaliphatic olefin may vary from as low as 0.1 to as high as 15, or even more. Since the reaction is on a mole per mole basis, however, it is generally desirable to employ essentially equal molar quantities of the reactants. The reaction may be carried out at atmospheric pressure or at superatmospheric pressure.

The reaction occurring between hexachlorocyclopentadiene and cyclohexene or its derivatives, in accordance herewith, appears to proceed in accordance with the Diels-Alder reaction.

Thus, without being bound by anything herein expressed or implied, it is believed that the reaction of hexachlorocyclopentadiene with a compound having the general formula

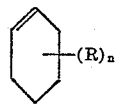

where R and $n$ have the same meaning as hereinabove defined, proceeds as follows:

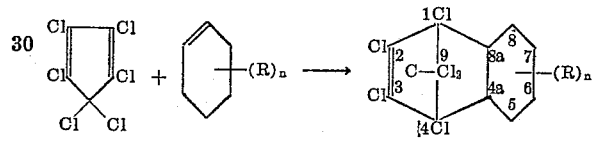

The products may be generically referred to as octahydro-hexahydro-1,4-methano-naphthalenes.

Whereas the so-called diene synthesis or Diels-Alder reaction is ordinarily considered in terms of a reaction between a conjugated diene and a second component having an ethylenic linkage flanked by carbonyl or carboxyl groups, e.g. maleic anhydride, there are instances of 1,4-addition of the diene to the 1,2-double bond of a compound having but one carbonyl group, e.g. 2,3-dimethylbutadiene and acrolein to give 3,4-dimethyl-$\Delta^3$-tetra-hydrobenzaldehyde.

Even more rare are examples of reaction of a diene with an aliphatic mono-olefin. The reaction of a hexachlorocyclopentadiene with cyclohexene or derivative as herein described, is new to the art and the outstanding insecticidal properties of the products are indeed surprising. Thus, under rather mild conditions, for example, as low as 60° C. and atmospheric pressure, but preferably from about 80° C. to about 140° C. the reaction of hexachlorocyclopentadiene and cycloaliphatic olefin may be conducted.

Temperatures will vary with the particular unsaturated cyclo-aliphatic charging stock, pressure, contacting time, sufficiency of contact and other reaction variables. In general, higher reaction rates are obtainable with increasing temperatures. Reaction times likewise vary, in accordance with the reaction temperature, quantities of reactants, and other typical variables. The reaction is usually complete in from about ½ to about 72 hours.

If desired, the reaction may be effected in the presence of an inert solvent such as saturated liquid hydrocarbons, benzene, etc.

One or more atoms of chlorine may be introduced to the final product if desired and the thus additionally chlorinated compounds have excellent insecticidal properties. Chlorination may be carried out by any well known method, e.g. by the addition of free chlorine to the compound in a solvent such as chloroform or carbon tetrachloride at temperatures in the range of from about −10° C. to 125° C. or higher or by treatment with sulfuryl chloride substantially in accordance with the method of U.S. 2,598,561, etc.

The following examples of preparation of compounds of the present invention are included to specifically illustrate the invention without the intention of necessarily limiting the same.

EXAMPLE 1

A mixture of 104 cc. cyclohexene and 160 cc. hexachlorocyclopentadiene (approximately a 1:1 mole ratio) was refluxed for 18 hours. The initial pot temperature was 100° C., rising steadily, as the cyclohexene reacted, to 136° C. The unreacted material was distilled off in vacuo, then 143 g. (88%) bright yellow viscous liquid distilled at 154°/0.8 and 163.5–165/3.5. This solidified to a solid mass. It was recrystallized from isopropyl alcohol, giving white crystals M.P. 76–77° C. Calculated for $C_{11}H_{10}Cl_6$,

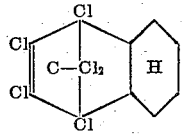

1,2,3,4,9,9 - hexachloro - 1,4,4a,5,6,7,8,8a - octahydro-1,4 - methano - naphthalene, Cl=60.0%. Found, Cl=60.2%.

EXAMPLE 2

A solution of 35.5 g. (.1 mole) product of Example 1 in 150 cc. carbon tetrachloride was illuminated with a 300 watt bulb and chlorinated with 4.55 cc. (.1 mole) chlorine at 25–50° C. over a 1 hour period. The solution was stripped in vacuo, giving 36 g. light yellow, viscous product $n_D^{20}$, 1.5698. Calculated for $C_{11}H_9Cl_7$, Cl=63.58%. Found, 64.4%.

EXAMPLE 3

A solution of 35.5 g. (.1 mole) product of Example 1 in 150 cc. carbon tetrachloride was illuminated with a 300 watt bulb and chlorinated with 13.65 cc. (.3 mole) chlorine at 30–60% C. over a 1½ hour period. The solution was stripped in vacuo, giving 42 g. light yellow viscous product; $n_D^{20}$, 1.5820. Calculated for $C_{11}H_8Cl_8$, Cl=67.0%. Found, Cl=68.0%.

EXAMPLE 4

A mixture of 65 cc. (about ½ mole) 4-methylcyclohexene and 80 cc. (½ mole) hexachlorocyclopentadiene was heated at 130° C. for 18 hours, then stripped in vacuo of unreacted material. 75.4 g. (84%) yellow viscous liquid distilled at 146–7° C./0.7, $n_D^{20}$, 1.5555, $d_4^{20}$, 1.520. Analyses calculated for $C_{12}H_{12}Cl_6$

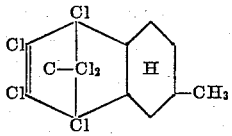

1,2,3,4,9,9-hexachloro-1,4,4a,5,8,8a-octahydro-1,4-methano-6-methylnaphthalene

Calculated: C, 39.04; H, 3.28; Cl, 57.69; mol. wt., 368.84. Found: C, 39.3; H, 3.11; Cl, 57.2; mol. wt., 365.

The compounds prepared in accordance with the above examples were tested for effectiveness on house flies by the so-called "Bell Jar Method" in accordance with which 25 flies are placed in a common laboratory Bell Jar and insecticide solution is then sprayed into the jar from the bottom by means of a suitable nozzle, e.g. a Peet-Grady nozzle. The percentage kill in 24 hours is then determined. The results of such tests are set forth in Table 1.

Table 1

| Sample [a] | Concentration in stock solution,[b] percent | Percent kill (24 hrs.) |
|---|---|---|
| 1 | 2 | 100 |
| 2 | 1 | 100 |
| 3 | 0.3 | 86 |
| 4 | 2 | 100 |
| 5 | 1 | 100 |
| 6 | 2 | 100 |
| 7 | 1 | 100 |
| 8 | 2 | 95 |
| Stock solution [b] | | 12 |
| O.T.I.[c] | | 35 |

[a] Samples 1, 2 and 3 were product from illustrative Example 1, supra; samples 4 and 5 were product from Example 2; samples 6 and 7 were product from Example 3; and sample 8 was product of Example 4.
[b] Stock solution comprises 2% lethane, 10% aromatic hydrocarbon solvent and 88% refined kerosene.
[c] Official Test Insecticide furnished by Chemical Specialties Manufacturers Assoc. comprising 0.1 mg. pyrethrins per 100 ml. of a suitable base oil.

In addition to the effectiveness of these compounds on house flies they have indicated a high killing power for clothes moth larvae and the very difficult-to-kill carpet beetle.

As indicated in Table 1 a variation in concentration of the novel insecticides of the present invention will result in a change in its effectiveness. And the amount used in a given instance will depend on the carrier employed, the insect to be killed, the conditions under which the material is used, etc. But, although the concentration may thus vary widely, e.g. from as low as about 0.01% up to 25% by weight and higher, it is generally satisfactory and preferred to employ an amount of from about 0.5 to about 3% by weight in an oil carrier. The compounds of the present invention may, however, be used in solid insecticide compositions as well, e.g. in well known solid carriers such as talc, pyrohillite, fuller's earth, bentonite, etc. And they may be used either alone or with additional insecticides, e.g. chlordane, methoxychlor, D.D.T., aldrin, isodrin, etc. in solid or liquid carriers.

Having thus described my invention, what I claim as novel and desire to protect by Letters Patent is set forth in the following claims.

1. Chlorinated 1,2,3,4,9,9-hexachloro-1,4,4a,5,6,7,8,8a-octahydro-1,4-methano-naphthalene wherein at least one hydrogen atom is replaced by an equal number of chlorine atoms.

2. Chlorinated 1,2,3,4,9,9-hexachloro-1,4,4a,5,6,7,8,8a-octahydro-1,4-methano-naphthalene wherein one hydrogen atom is replaced by a chlorine atom.

3. Chlorinated 1,2,3,4,9,9-hexachloro-1,4,4a,5,6,7,8,8a-octahydro-1,4-methano-naphthalene wherein two hydrogen atoms are replaced by two chlorine atoms.

4. Monochlorinated 1,2,3,4,9,9-hexachloro-1,4,4a,5,6,7,8,8a-octahydro-1,4-methano-naphthalene having the formula $C_{11}H_9Cl_7$ and having a refractive index $n_D^{20}$ of 1.5698.

5. Dichlorinated 1,2,3,4,9,9-hexachloro-1,4,4a,5,6,7,8,8a-octahydro-1,4-methano-naphthalene having the formula $C_{11}H_8Cl_8$ and having a refractive index $n_D^{20}$ of 1.5820.

References Cited in the file of this patent

UNITED STATES PATENTS

| 2,635,977 | Lidov | Apr. 21, 1953 |
| 2,676,132 | Bluestone | Apr. 20, 1954 |
| 2,724,730 | Johnson | Nov. 22, 1955 |